US007194892B2

(12) United States Patent
Fröhlich

(10) Patent No.: US 7,194,892 B2
(45) Date of Patent: Mar. 27, 2007

(54) METHOD AND DEVICE FOR MONITORING WIRE STAPLES APPLIED TO PRINT PRODUCTS BY A WIRE-STITCHING MACHINE

(75) Inventor: Walter Fröhlich, Weiningen ZH (CH)

(73) Assignee: Müller Martini Holding AG, Hergiswil (CH)

(*) Notice: Subject to any disclaimer, the term of this patent is extended or adjusted under 35 U.S.C. 154(b) by 0 days.

(21) Appl. No.: 11/114,197

(22) Filed: Apr. 26, 2005

(65) Prior Publication Data

US 2005/0247142 A1 Nov. 10, 2005

(30) Foreign Application Priority Data

Apr. 26, 2004 (EP) .................................. 04405256

(51) Int. Cl.
*G01N 9/00* (2006.01)

(52) U.S. Cl. ...................................... 73/32 R; 702/137

(58) Field of Classification Search ................ 73/32 R, 73/865.8; 227/48; 702/137
See application file for complete search history.

(56) References Cited

U.S. PATENT DOCUMENTS 4,421,264 A 12/1983 Arter et al.
5,230,457 A 7/1993 Hiroi et al.
5,678,745 A * 10/1997 Yoshie .......................... 227/4
2003/0164766 A1* 9/2003 Britton ....................... 340/552

FOREIGN PATENT DOCUMENTS

DE 3817025 A1 * 12/1988
DE 38 17 024 A1 3/1989
DE 3817024 A1 * 3/1989
EP 0 205 144 A2 12/1986
EP 0 724 936 A1 8/1996
EP 1 029 643 A1 8/2000
JP 01253684 A * 10/1989

OTHER PUBLICATIONS

Nishikubo Hironori, "STAPLER" Applicant: Minolta Co. Ltd., Mar. 28, 2000, Patent Abstracts of Japan.

* cited by examiner

*Primary Examiner*—Hezron Williams
*Assistant Examiner*—Ryan Christensen
(74) *Attorney, Agent, or Firm*—Venable LLP; Robert Kinberg; Ryan M. Flandro

(57) ABSTRACT

A method and apparatus are provided for monitoring the wire-stitching on print products in a wire-stitching machine. The wire-stitching includes wire staples having ends to be closed. The wire-stitching machine includes a measuring device operative to measure a density on the ends of passing wire staples to test the quality of the passing wire staples.

4 Claims, 4 Drawing Sheets

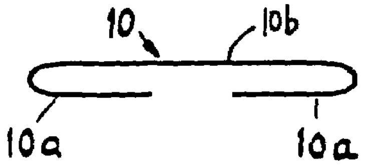
Fig. 4a
Fig. 4b
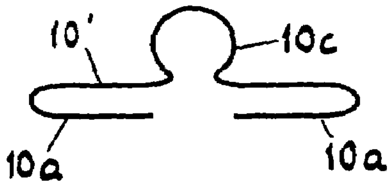
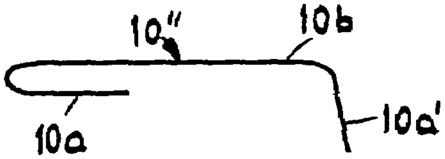
Fig. 5a
Fig. 5b
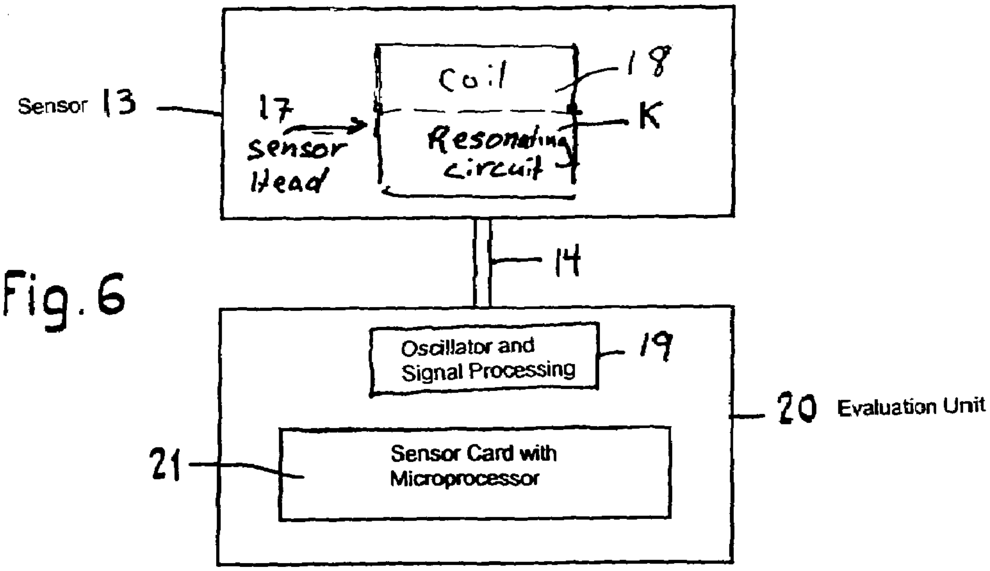
Fig. 6

METHOD AND DEVICE FOR MONITORING WIRE STAPLES APPLIED TO PRINT PRODUCTS BY A WIRE-STITCHING MACHINE

CROSS-REFERENCE TO RELATED APPLICATION

This application claims the priority of European Patent Application No. 04405256.1-2304, filed on Apr. 26, 2004, the subject matter of which is incorporated herein by reference. The disclosure of all U.S. and foreign patents and patent applications mentioned below are also incorporated herein by reference.

BACKGROUND OF THE INVENTION

The invention relates to a method and device for monitoring the wire-stitching on print products in a wire-stitching machine, wherein measuring devices are provided for testing the wire staple quality.

The technique of stapling together print products by means of wire staples in a wire-stitching apparatus is known. Wire-stitching machines typically comprise a stitching head and a wire-bending device for realizing the stitching operation. The operation involves supplying a wire, cutting the blank, forming the staple, pushing the staple through the product to be stapled, and bending the two staple legs.

Methods and devices are known which can be used to test for the existence of a wire staple on a product, thus making it possible to remove a product that is missing a wire staple. The testing can be realized, for example, by means of a metal detector which is arranged downstream from the wire-stitching apparatus. Each passing wire staple triggers an impulse. A missing impulse therefore indicates a product with a missing wire staple. Furthermore, European Patent Document EP 0 205 144 teaches an apparatus wherein a missing wire staple is detected by means of a sensor arranged on a stitching machine, wherein the sensor comprises one of an approximation switch or an optical sensor.

However, the above-mentioned methods and devices can only be used to detect the presence, and not the quality, of the wire-stitching. Thus, wire staples which are defective, for example those that have an outward-projecting leg, are nonetheless indicated as being present. Wire-stitching defects of this type are highly undesirable because they can result in injuries to the users and/or readers of such a print product. For that reason, numerous measures have already been proposed for detecting such defective stitching operations and for removing the corresponding print products. Thus, a device for monitoring the stitching of products is known from European patent document EP 1 029 643 A, which is co-owned by the assignee of the present application, wherein the wire-stitching machine is provided with measuring devices for detecting changes in the condition of the bending device or stitching head. For example, these devices use wire strain gauges to detect the force generated at the bending device during the forming of the wire staple. If this force deviates from a predetermined value, it is assumed that the wire-stitching is defective and the product is accordingly removed via the machine control.

SUMMARY OF THE INVENTION

It is an object of the present invention to make available further suitable measures for testing wire-staple quality.

The above and other objects are achieved according to the invention by the provision of a method for monitoring wire staples on print products applied by a wire-stitching machine, the wire staples having ends to be closed by the wire stitching machine, the method comprising: arranging a measuring device to measure a density of the ends of the wire staples passing by the measuring device; and evaluating a curve obtained from the measured density to test a quality of the passing wire staples.

The invention is based on the finding that with defective wire staples, e.g. staples where a leg is projecting or missing, the density curve deviates considerably from that of a non-defective wire staple. With a non-defective wire staple both legs are present and are bent in the intended manner to rest against the print product, such that the staple normally does not pose a risk of injury. With the method according to the invention, however, other defects in a stitching operation can also be determined. For example, the method can also be used to detect defects in so-called eyelet wire staples, such as bent eyelets.

According to another exemplary embodiment of the invention, the measuring device is positioned downstream of a stitching head of the wire-stitching machine. The passing wire staples are tested. A method of this type is particularly suitable for a gathering and wire-stitching machine on which print products are conveyed on a transport chain.

According to another exemplary embodiment of the invention, the measuring operation is particularly reliable and operationally safe if the measuring device is positioned on the inside of the opened product during the measuring operation. In this embodiment of the invention, the measuring device can be moved comparatively close to the wire staples to be tested.

In yet another exemplary embodiment of the invention, the measuring device includes a sensor that generates a magnetic field. The wire staples to be tested pass through the magnetic field, thus permitting a particularly precise testing of the density curve of each wire staple. More particularly, the measuring device includes an electric resonating circuit having a coil, the inductance of which is change by the density of the metal staple as it passes by the measuring device.

The invention furthermore relates to an apparatus to monitor wire staples applied by a wire-stitching machine on print products, the apparatus comprising: a measuring device operative to measure a density of wire staples inserted into print products passing by the measuring device; and an evaluating device to evaluate a density curve obtained from the measured density to test the quality of the wire staples.

In a further exemplary embodiment of a gathering and wire-stitching machine according to the invention, the measuring device is arranged near the transport chain, below the opened print products, such that the staples can be closely measured at the ends to be closed.

Further advantageous features will become apparent from the following description, drawings and examples.

BRIEF DESCRIPTION OF THE DRAWINGS

An exemplary embodiment of the invention is explained in further detail with the aid of the accompanying drawings.

FIGS. 4*a* and 4*b* schematically depict representations of non-defective wire staples.

FIGS. 5*a* and 5*b* schematically depict representations of defective wire staples.

FIG. 6 is a functional block diagram of components for the apparatus according to the invention.

DETAILED DESCRIPTION OF THE INVENTION

Figure 1:
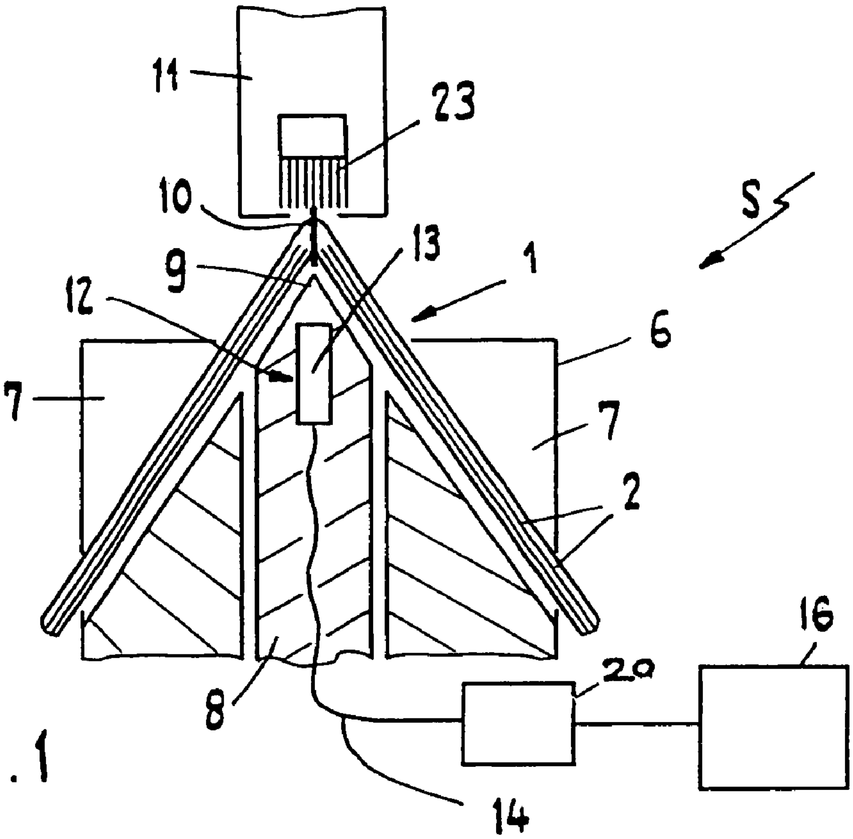
FIG. 1 schematically depicts a partial section through a wire-stitching machine provided with a device according to the invention.
Figure 2:
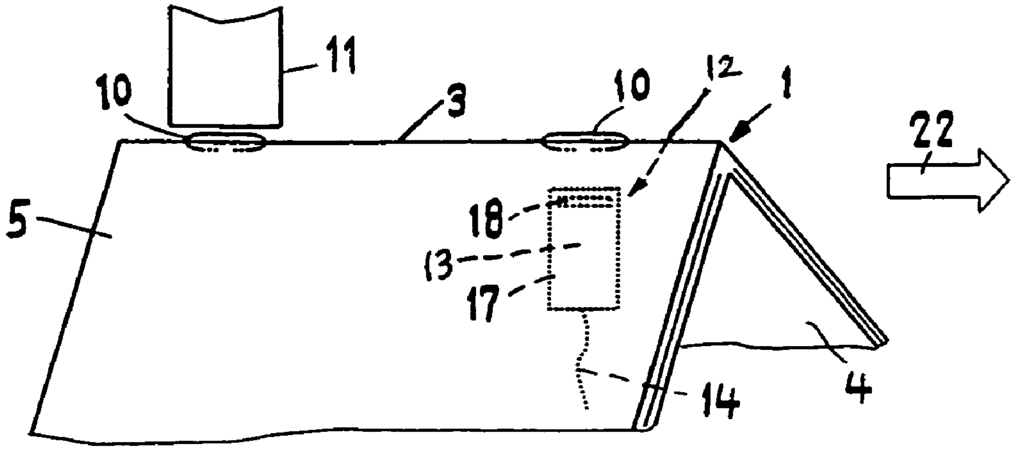
FIG. 2 schematically depicts a spatial view of a wire-stitching print product and a device according to the invention.

According to an exemplary embodiment of the invention, FIG. 1 shows a print product 1 which is located on a gathering and wire-stitching machine S that is known per se in the print-processing industry. The print product 1, for example, is a booklet consisting of several pages 2, for example held together along a spine 3 with two wire staples 10, as shown in FIG. 2. The product 1 can also be held together by a single wire staple 10 or by more than two wire staples 10. The wire staple 10 is a standard wire staple as shown in FIG. 4*a*, having a substantially straight wire staple back 10*b* and two wire staple legs 10*a* that are bent by 180 degrees. The wire staple legs 10*a* form the ends of the wire staples 10 and, as can be seen, are bent toward the inside so that they rest against the inside 4 of the print product 1 pointing toward one another. The wire staples 10 can also be designed as shown in FIG. 4*b* to comprise an eyelet 10*c* in the center which projects upward from the spine 3 and/or the outside 5 of the print product 1. The wire staple 10' also has wire-staple legs 10*a* which are bent toward the inside. Other wire staple configurations are also conceivable.

The gathering and wire-stitching machine S comprises a saddle 8 with saddle ridge 9 which is rigidly attached to a frame of the gathering and wire-stitching machine S, not shown herein. The print products 1 are transported by a transport chain 6 which is an endless link chain provided at specified intervals with wing-type carriers 7 that carry along the print products 1. The gathering and wire-stitching machine S and the transport chain 6 in this case are only examples for transporting and/or gathering devices for assembling print products 1, e.g. booklets. Thus, other transporting means can also be used for transporting the print products 1.

The wire staples 10 are formed in a wire-stitching machine S having a stitching head 11, which is arranged so that the print products 1 are stapled from above, as shown in FIGS. 1 and 2. During the wire-stitching operation, the print product 1 is arranged between the stitching head 11 and a bending device, not shown herein. Once the staple is formed, it is then punched through the print product 1 and the two staple legs are bent in the manner known per se with the aid of leg benders which are also not shown herein. For example, if two wire staples 10 are formed as shown in FIG. 2, the print product 1 is transported on the transport chain 6 in the direction of arrow 22 (FIG. 2) for further processing. For example, the print product 1 is supplied to a cutter.

If the above-described operation for forming the wire staple 10 is faulty, the print product 1 may contain defective wire staples 10" or 10''' shown in FIGS. 5*a* and 5*b*, respectively. For example, one staple leg 10*a*' of the wire staple 10" shown in FIG. 5*a* is not bent toward the inside, as intended, but instead projects outward from the wire staple back 10*b* at about 90 degrees. The wire staple leg 10*a*' accordingly projects on the inside 4 of the print product 1. Likewise, one staple leg 10*a*''' of the wire staple 10''' is also not bent correctly. The two wire staples 10''' and 10''' carry the risk of injury to the user of the print product 1, this danger being particularly high for children.

According to an exemplary embodiment of the invention shown in FIGS. 1 and 2, at least one measuring device 12 is provided for detecting such defective wire staples 10" and 10''', as well as other defective forms, and for removing the respective print products 1. In a further exemplary embodiment, the measuring device 12 is arranged such that the print products 1 are transported across the measuring device 12, as shown in FIGS. 1 and 2. The measuring device 12 is located on the inside 4 of the opened print product 1 and directly below a spine 3 of a print product 1.

Figure 3:
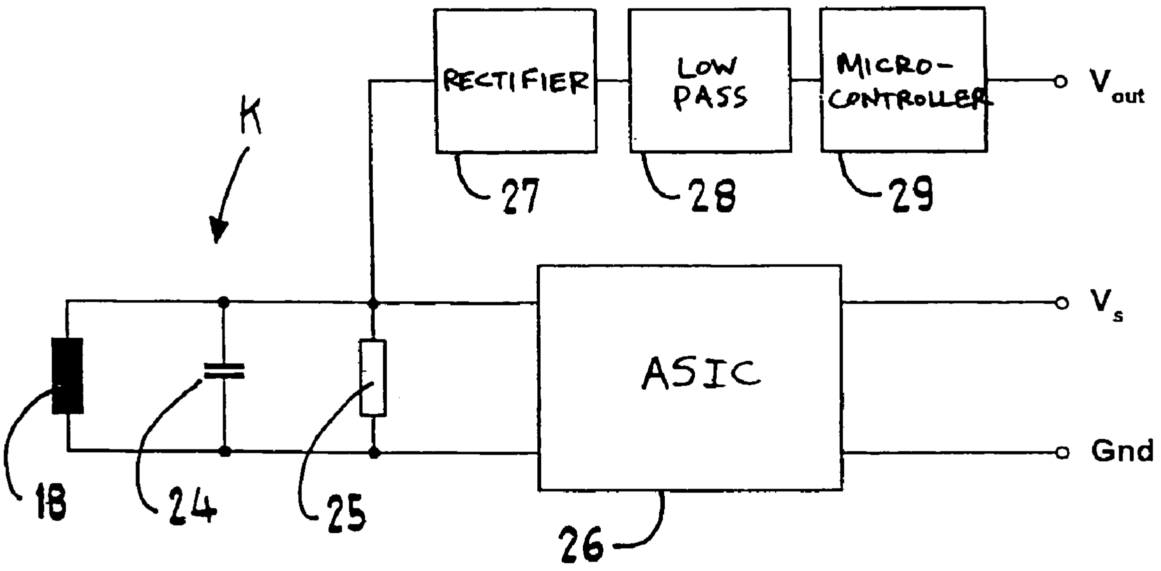
FIG. 3 depicts a block diagram of a resonating circuit for implementing a sensor according to an embodiment of the invention.

According to FIG. 6, each measuring device 12 is provided with a sensor 13 comprising a sensor head 17 having a coil 18 arranged therein. The sensor 17 is connected via a signal line 14 to an oscillator 19 in an evaluation unit 20 for signal processing. The evaluation unit 20 also includes a sensor card 21 with microprocessor. As shown in FIG. 3, the sensor 13 of the measuring device 12 includes a resonating circuit K. The resonating circuit K comprises the above-referenced coil 18 which is connected in parallel with a capacitor 24 and a resistor 25. Also provided are an ASIC (application-specific integrated circuit) 26, a rectifier 27, a low pass 28, and a microcontroller 29. The aforementioned components and the mode of operation of such a resonating circuit are known to the person skilled in the art.

Furthermore, as shown in FIGS. 1 and 2, the stitching head 11 of the wire-stitching machine S includes a locally fixed brush 23 for pressing the spine 3 of the passing print product 1 downward against the ridge 9. The measuring device 12 is arranged below and downstream from the stitching head 11. As a result, the distance between the spine 3 and the sensor 13 is essentially always the same. The formed wire staples 10 thus pass across the sensor 13 with uniform spacing. Alternatively, the sensor 13 could move back and forth in the transport direction. Thus, the relative movement between sensor 13 and print product 1 is important. When a wire staple 10 is positioned above the sensor 13, the wire staple 10 influences the inductance of the resonating circuit K and causes the frequency to change. This frequency change signal is detected by the evaluation unit 20 with oscillator 19 and sensor card with microprocessor 21. The inductance of the resonating circuit K depends on the metal density of the wire staple 10. The metal density for each wire staple 10 is the amount of metal per unit of length. As a result, the signal curve substantially corresponds to the shape of the wire staple 10. Since the shape of wire staples 10" and 10''' differs substantially from that of wire staple 10, the signal curve differs in the same way, wherein this difference is illustrated in the following with the aid of FIGS. 7 and 8.

Figure 7:
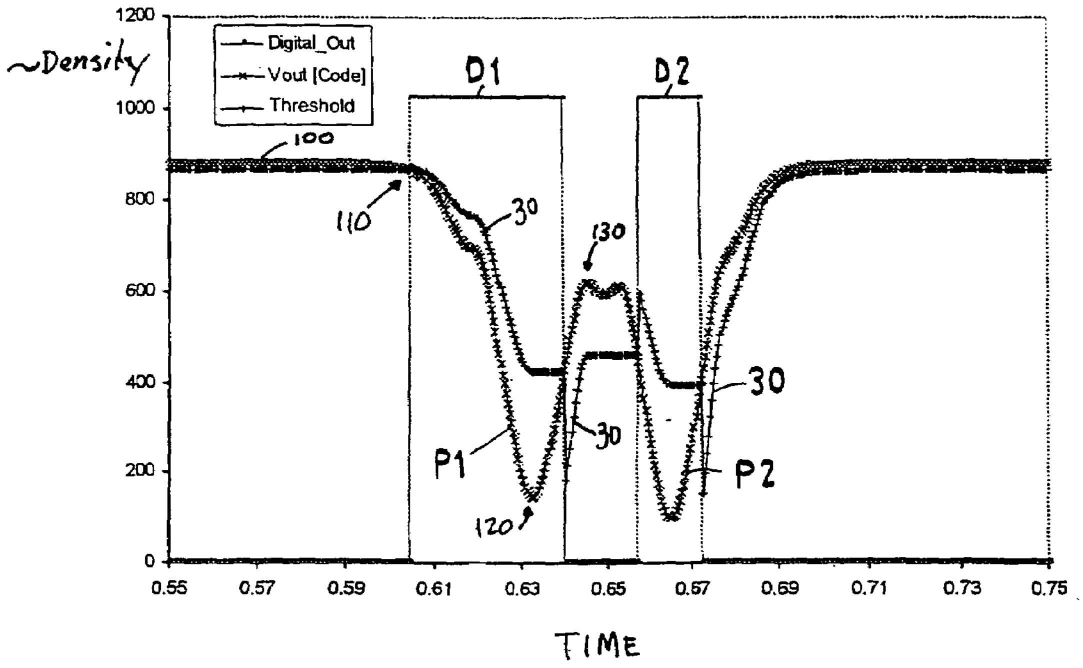
FIG. 7 depicts the signal curve for a print product, provided with two spaced apart non-defective wire staples, wherein the horizontal axis represents time and the vertical axis represents density.

FIG. 7 shows the signal curve during the testing of a print product 1 with two non-defective wire staples 10 which are arranged at a distance from each other, as shown in FIG. 2, wherein the spacing between the two wire staples 10 is 27 mm. The staples are formed from a copper wire or steel wire having a diameter of 0.6 mm. The two staples 10 generate two pulses P1 and P2, as shown in FIG. 7. From these peaks, digital signals D1 and D2 are generated with the aid of an algorithm. This algorithm is explained in further detail in the following.

An idle signal indicates the normal, uninfluenced state of the sensor 13 and forms the basis of the algorithm. This idle signal is temperature-dependent and can be influenced by surrounding metal parts. Consistent operation of the sensor 13 is ensured by a reference signal generated by machine control unit 16 to continuously adjust the idle signal. This reference signal is generated during the start-up of the gathering and wire-stitching machine S.

The digital signals D1 and D2 are generated by the above-mentioned algorithm if a wire staple 10 is located above the sensor 13. A threshold 30 that is below the idle signal is additionally computed. When an analog signal 100 drops below the threshold 30, the digital "wire staple detected" signal D1 is emitted and a hysteresis value is added to the threshold value 30, thus preventing a bouncing at the switching point 110. The aforementioned threshold 30 follows the actual analog signal 100 until a minimum 120 is reached. Once the analog signal 100 reaches the minimum 120, the threshold 30 remains constant. When the analog signal 100 subsequently exceeds the threshold 30, the digital "wire staple detected" signal D1 is reset and a new threshold 30 is computed on the basis of the analog signal 100. The threshold 30 again follows the analog signal 100 until a maximum value 130 is reached. Following this, the threshold 30 remains constant, awaiting a new drop below the threshold 30 due to a new wire staple 10.

The degree of adaptation of the threshold 30 can be adjusted via two parameters, wherein one parameter adjusts the strength of the adaptation in the OFF state and the other parameter adjusts the adaptation of the threshold 30 in the ON state of the digital "wire staple detected" signal. In the normal, uninfluenced state, a specified offset to the idle signal is subtracted to compute the threshold 30.

Figure 8:
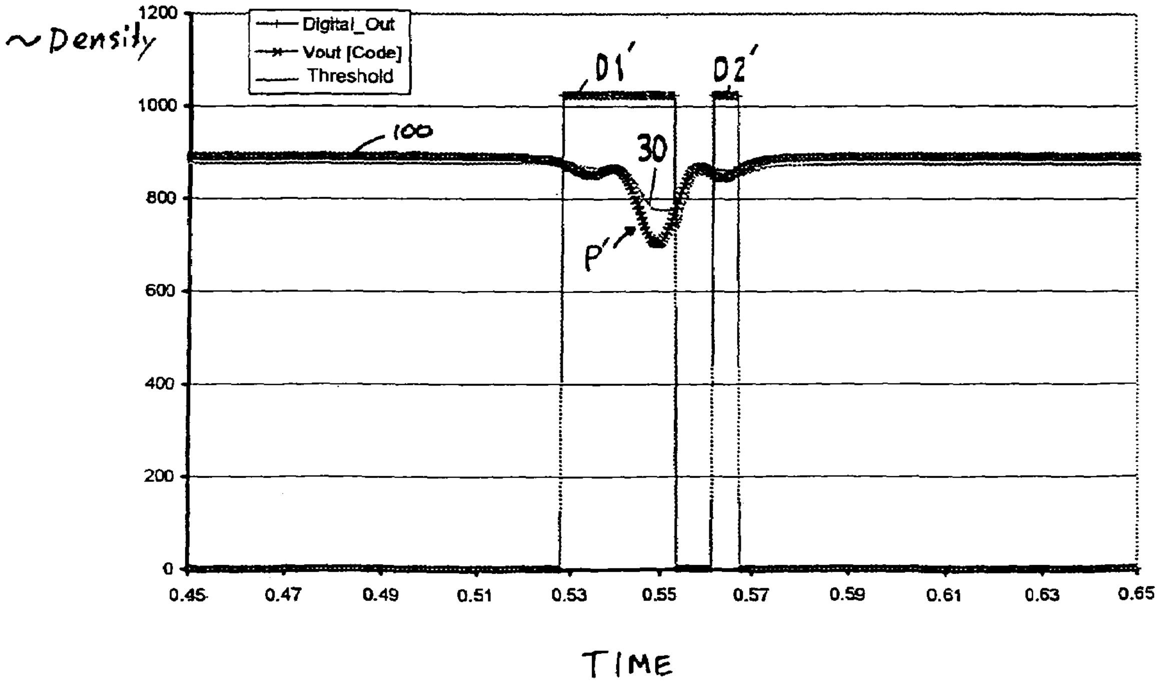
FIG. 8 depicts the signal curve for a wire staple with one cut-off leg, wherein the horizontal axis represents time and the vertical axis represents density.

As shown in FIG. 7, a passing print product 1 having two non-defective wire staples 10 or 10' generates two digital signals D1 and D2. In contrast, a passing print product 1 having one defective wire staple 10" or 10'" therein generates two digital signals D1' and D2', as shown in FIG. 8. Owing to the density curve for a defective wire staple 10" or 10'", the corresponding peak P' is irregular. As a result, two digital signals D1' and D2' are generated for one defective wire staple 10" or 10'" instead of just one digital signal per wire staple as in the case of a passing non-defective wire staple 10'. The control recognizes that two digital signals D1' and D2' are generated for the defective wire staple 10" or 10'" and triggers the removal of the defective print product 1.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for monitoring wire staples applied on print products by a wire-stitching machine, the wire staples having ends that are bent by the wire-stitching machine, the method comprising:

passing the print products by a measuring device to produce a signal representing metal density of the passing wire staples;

developing a curve based on metal density of each wire staple; and evaluating the curve to detect defective wire staples.

2. The method according to claim 1, wherein:

the measuring step includes measuring the metal density with a coil that is part of a resonating circuit have a frequency that changes with changes in the inductance of the coil caused by changes in the measured metal density of the passing wire staples; and the evaluating step includes evaluating frequency changes to detect defective wire staples.

3. An apparatus for monitoring wire staples applied by a wire-stitching machine on print products, the apparatus comprising:

a sensor operative to produce a signal frequency as a function of metal density of wire staples inserted into printed products and passing by the sensor; and an evaluation unit coupled to the sensor and operative to evaluate changes in the signal frequency generated by the sensor to determine a quality of the wire staples.

4. The apparatus according to claim 3, wherein the sensor comprises an electric resonating circuit having a coil the inductance of which is influenced by a passing wire staple.

* * * * *